United States Patent [19]

Bowen

[11] 4,150,657
[45] Apr. 24, 1979

[54] SOLAR COLLECTOR

[75] Inventor: Robert F. Bowen, Burlington, Mass.

[73] Assignee: Raytheon Company, Lexington, Mass.

[21] Appl. No.: 853,375

[22] Filed: Nov. 21, 1977

[51] Int. Cl.² ................................................ F24J 3/02
[52] U.S. Cl. ..................................... 126/271; 165/169
[58] Field of Search ................... 52/86; 126/270, 271; 237/1 A; 62/525; 165/169, 171

[56] References Cited

U.S. PATENT DOCUMENTS

| 3,039,453 | 6/1962 | Andvassy | 126/271 |
| 3,621,671 | 11/1971 | Ullrich | 62/525 |
| 4,055,162 | 10/1977 | Gonzalez | 126/271 |
| 4,064,866 | 12/1977 | Knight, Jr. | 126/271 |

Primary Examiner—Casmir A. Nunberg
Attorney, Agent, or Firm—Harold A. Murphy; Joseph D. Pannone; John T. Meaney

[57] ABSTRACT

A solar collector which includes a radiation-absorbing panel having a surface provided with integral fluid-conducting conduits whereby heat absorbed by the panel may be efficiently transferred directly to fluid circulating in the conduits.

4 Claims, 5 Drawing Figures

SOLAR COLLECTOR

BACKGROUND OF THE INVENTION

The need for efficient solar energy collectors has become extremely important with the advent of conservation of heat-producing natural resources such as gas and oil. However, while solar collectors now have been produced for converting solar energy to useable heat, they are relatively expensive and in fact are so expensive that it is questionable whether they can be economically substituted for or make supplemental to conventional heat-producing systems.

Solar collectors of one well known type usually utilize a boxlike housing containing a solar radiation-absorbing panel covered by a radiation-transparent glazing, usually glass or plastic sheeting. Metal piping is mounted on the under side of the panel in some manner so that when the panel is heated by impinging solar radiation, the resultant heat will be transferred to a fluid which is circulating through the piping. The piping, usually copper tubing, is expensive and must be supported in efficient heat-transfer relation to the panel.

For example, in U.S. Pat. No. 3,039,453 there is disclosed a solar collector which comprises a plate or panel which has in its back side a number of parallel grooves which may be formed by crimping. Flexible tubing is snapped into the grooves and heat from the panel is transferred to fluid which circulates through the tubing. However, it has proved to be difficult to efficiently transfer heat from the panel to the fluid in such a structure because often the tubing is not retained in good thermal contact with the walls of the grooves throughout their lengths.

One method of overcoming the problem is taught by U.S. Pat. No. 3,898,979 which discloses a somewhat similar structure with the addition of a heat-conducting material between the tubing and the walls of the grooves, which material is intended to bond the adjacent wall and tubing surfaces together and provide complete contact between the surfaces throughout their lengths and thereby enhance the transfer of heat to the fluid. This solution, however, requires a relatively costly manufacturing operation and will not guarantee success.

A further method of retaining a flexible tubing in thermal contact with a solar radiation absorbing plate is also disclosed in U.S. patent application Ser. No. 689,608, filed May 24, 1976 and assigned to the assignee of the present invention. In said application the panel is formed of two or more sections disposed in a common plane in side-by-side relation with their edges being provided with curved digits or fingers, the fingers of one panel interfitting with the fingers of an adjacent panel to from a substantially solid tubular configuration within which a tubing is disposed. The fingers thus grip the tubing and are in good thermal contact with it without requiring an intermediate bond. However, the panels must be stamped to form the fingers and subsequently assembled together and with a tubing. This is efficient but not the most economical construction.

SUMMARY OF THE INVENTION

The above and other disadvantages of prior art solar collectors are partially or completely overcome by the present invention which comprises a collector having therein an absorber plate which has integral conduits formed on its surface, thus eliminating the need for piping as is required in known collectors.

The integral conduits are formed by conventional roll forming techniques whereby crimped grooves are initially formed in a single thin strip of metal such as copper or aluminum which have good thermal absorption characteristics. At the output end of the rollform station the crimped metal strip proceeds to an automatic welding station where the crimped areas of the strip will be continuously welded throughout their lengths so as to form completely sealed conduits integral with the strip. The strip may then be sheared into the proper lengths required in solar collectors.

This system has the additional advantage that the diameter of the conduits may be varied to satisfy flow requirements by merely making the necessary adjustments to the roll forming apparatus. Also, not only is the need for separate tubing eliminated, but with this invention direct contact is made between the transfer fluid and the absorber plate, providing direct thermal transfer. The described structure also eliminates the prior mechanical or soldered joint between the absorber plate and the tubing. The invention also offers greater flexibility in sizes of collectors which may be made.

Manufacture of collectors embodying this invention allows production of high quality and highly efficient solar collector plates at extremely low cost and very high volume.

BRIEF DESCRIPTION OF THE DRAWINGS

The foregoing and other advantages of this invention will become apparent from the following description taken in connection with the accompanying drawings, wherein.

DESCRIPTION OF THE PREFERRED EMBODIMENTS

Figure 1:
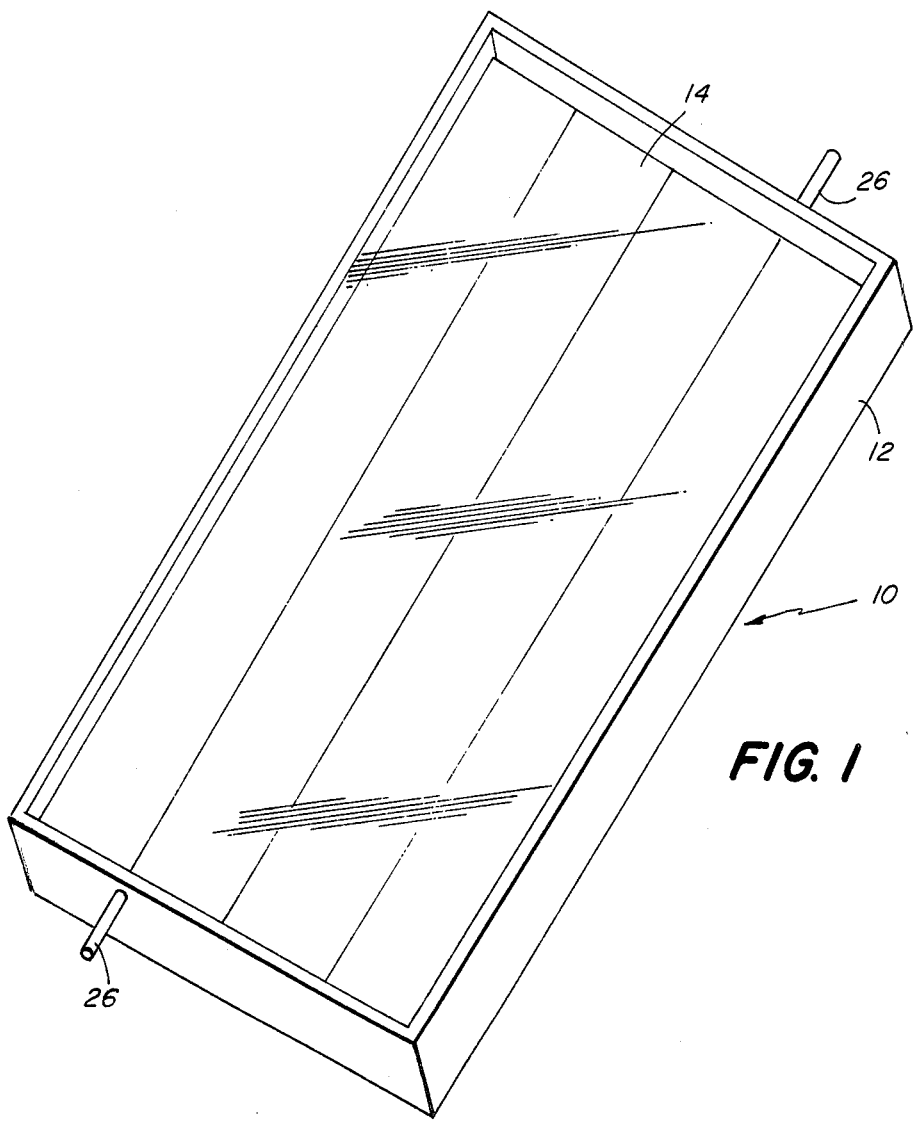
FIG. 1 is an isometric view of a solar collector embodying the invention.
Figure 2:
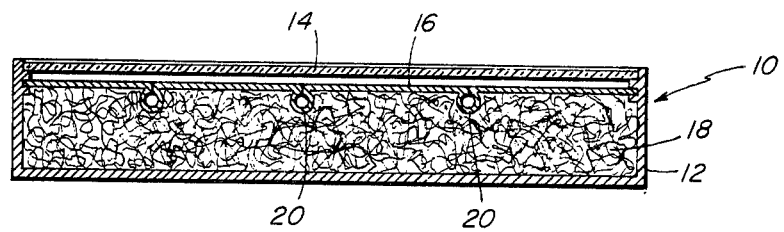
FIG. 2 is a transverse sectional view through the collector shown in FIG. 1.

Referring more particularly to the drawings, and especially to FIGS. 1 and 2, there is shown a solar collector 10 which comprises a suitable boxlike enclosure 12 having an open upper side which is closed by a transparent glass or plastic pane or glazing 14. Beneath the glazing 14 and spaced from it is a collector or absorber plate or panel 16 formed of material which will absorb and conduct heat when subjected to solar radiation. Such radiation will pass to the panel 16 through the glazing 14. Aluminum, steel and copper are among the many materials particularly suitable for use as absorber panels, and the panels may have their upper surfaces coated or painted with any suitable black material to enhance heat absorption.

As is well known, it is desirable to provide tubing or conduit in efficient heat-conductive relation to the panel 16 for conducting a flow of water or other fluid which becomes heated when heat is generated in the absorber plate by solar radiation. Such heat is generally transmitted through the walls of the tubing or conduits directly into the fluid. The heated fluid may be utilized for domestic use, such as for heating a building, for heating water for in-house use or in a swimming pool, or for other selected uses as desired.

The panel 16, which may comprise a number of separate plates disposed to lie substantially in a single plane and in edge-to-edge or overlapped relation, will preferably comprise a single sheet of metal of about 0.010–0.030 inches in thickness, for example. Such sheet metal is conveniently made in long strips placed on rolls and can be unrolled and cut off to the desired lengths by well known methods.

Beneath the absorber panel 16 and within the bottom of the receptacle 12 is a layer 18 of suitable thermal insulating material to restrict loss of heat in a downward direction, while the transparent glazing 14 prevents escape of any substantial amount of heat in an upward direction.

Figure 3:
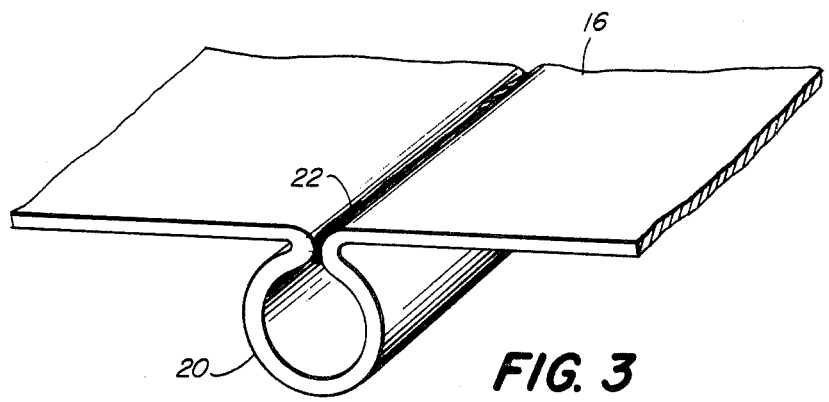
FIG. 3 is an enlarged isometric view of a portion of an absorber panel with integral conduit according to the invention.

In accordance with this invention, the panel 16 is provided with integral conduits 20 (FIG. 3) whereby fluid may be circulated in direct contact with the panel material with requiring separate tubing for the purpose. To form such integral conduits 20, the initial flat strip of sheet metal is run through conventional roll forming machinery which provides the metal with rounded grooves which are substantially closed at the top. Then the roll formed metal sheet is processed through an automatic welding station positioned adjacent the output end of the rollform machine where a continuous weld is made to form a seam 22 which completely closes the open top of the grooves. Thus, completely enclosed integral conduits 20 are provided on the panel 16. It will be apparent that such conduits may be located on either the upper or the lower surface of the panel, as desired.

Figure 4:
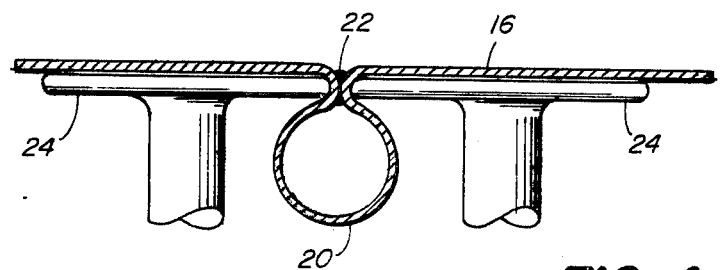
FIG. 4 is an end view of the device of FIG. 3 illustrating the process of welding a conduit.
Figure 5:
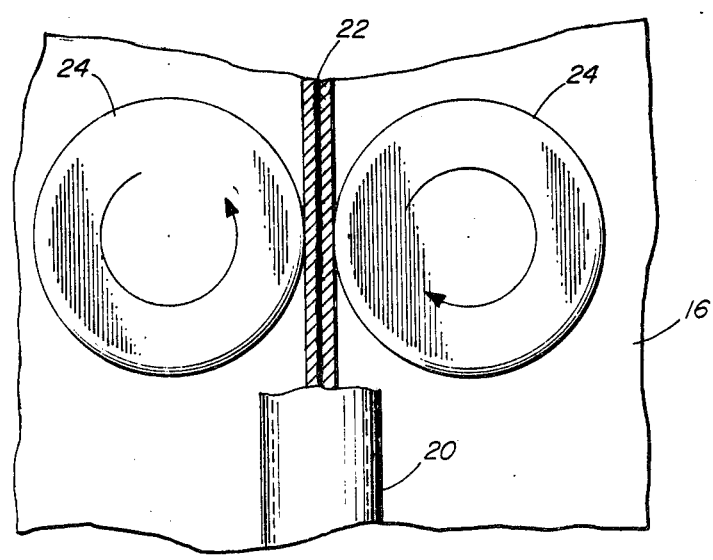
FIG. 5 is a bottom plan view of the device shown in FIG. 4.

FIGS. 4 and 5 diagrammatically illustrate how a conduit 20 is formed by moving a panel 16 in such a manner that the preformed groove passes between two wheel-type welding electrodes 24 which are spaced apart sufficiently to engage opposie sides of the panel material at the base of a groove. By applying electrical potential to the electrodes in the well known manner a welding arc may be created to form the solid joint or seam 22. Such a welding operation may be continuous throughout the length of the roll of sheet metal. After leaving the welding station the sheet is cut into appropriate panel lengths. The resultant panels 16 will thus be provided with integral conduits 20 through which water or other fluid to be heated is circulated. Couplings 26 (FIG. 1) attached to the ends of conduits 20 will be used to connect the collectors into any suitable circulating fluid system.

It will be apparent that an economical solar collector panel is achieved by the present invention, one which is also extremely efficient by virtue of the fact that heat from as absorber panel is transferred directly to the circulating fluid.

From the foregoing it will be apparent that a more economically manufactured and more efficient solar collector has been made by utilization of an absorber plate having integral fluid conduits in accordance with this invention.

It is to be understood, however that various modifications and changes in the construction and method shown and described may be made by those skilled in the art without departing from the spirit of the invention as expressed in the accompanying claims. Therefore, all matter shown and described is to be interpreted as illustrative and not in a limiting sense.

What is claimed is:

1. A solar energy collector comprising an open-topped receptacle, a panel in said receptacle positioned to be contacted by solar radiation entering the receptacle, at least one integral fluid conduit on said panel, said fluid conduit comprising a groove recessed within the panel and having a substantially annular cross-sectional configuration with a seam at the open side thereof, a weld closing said seam, and means for connecting said conduit to a source of circulating fluid.

2. A solar energy collector as set forth in claim 1 wherein said panel has a substantially planar surface to be contacted by said solar radiation entering the receptacle, said groove is recessed in the panel beneath said planar surface, and said weld seals said seam throughout its length and provides a continuous integral conduit through which said fluid may flow in direct thermal contact with material of the panel.

3. A radiation-absorbing panel for a solar energy collector comprising a metal sheet having a side thereof disposed substantially in a plane for contact by solar radiation, said sheet having at least one integral fluid conduit thereon, said fluid conduit comprising a groove recessed within the sheet and having a substantially annular cross-sectional configuration with a seam at the open side thereof, and a weld closing said seam.

4. A panel as set forth in claim 3 wherein said sheet has a substantially planar surface to be contacted by said solar radiation, said groove is recessed in the sheet beneath said planar surface, and said weld seals the seam throughout its length and provides a continuous integral conduit through which fluid may flow in direct thermal contact with material of the panel.

* * * * *